(12) United States Patent
Shimomura

(10) Patent No.: US 11,834,848 B2
(45) Date of Patent: Dec. 5, 2023

(54) FLOORING MATERIAL SYSTEM

(71) Applicant: Magic Shields, Inc., Shizuoka (JP)

(72) Inventor: Hiroshi Shimomura, Shizuoka (JP)

(73) Assignee: Magic Shields Inc., Shizuoka (JP)

( * ) Notice: Subject to any disclaimer, the term of this patent is extended or adjusted under 35 U.S.C. 154(b) by 0 days.

(21) Appl. No.: 17/824,865

(22) Filed: May 25, 2022

(65) Prior Publication Data

US 2022/0282497 A1 Sep. 8, 2022

Related U.S. Application Data

(63) Continuation of application No. PCT/JP2020/044411, filed on Nov. 30, 2020.

(30) Foreign Application Priority Data

Nov. 29, 2019 (JP) ................................. 2019-217550

(51) Int. Cl.
*E04F 15/22* (2006.01)
*B32B 3/08* (2006.01)
(Continued)

(52) U.S. Cl.
CPC .............. *E04F 15/225* (2013.01); *B32B 3/08* (2013.01); *B32B 21/045* (2013.01); *B32B 25/12* (2013.01);
(Continued)

(58) Field of Classification Search
CPC .... E04B 1/98; E04B 5/02; E04F 15/22; E04F 15/225; E04F 15/02177; E04F 15/107
See application file for complete search history.

(56) References Cited

U.S. PATENT DOCUMENTS 2,919,476 A * 1/1960 Bernhard ............... E04F 15/225
52/474
3,499,255 A * 3/1970 Eberhart ................. E04F 15/22
52/263
(Continued)

FOREIGN PATENT DOCUMENTS

CN 207499324 U 6/2018
CN 208792676 U 4/2019
(Continued)

OTHER PUBLICATIONS (ISA/237) Written Opinion of the International Search Authority for International Patent Application No. PCT/JP2020/044411, issued/mailed by the Japan Patent Office dated Feb. 2, 2021.
(Continued)

*Primary Examiner* — Jessie T Fonseca

(57) ABSTRACT

Provided is a flooring material system capable of exerting a high impact absorption capability at the time of falling while at the time of walking, a stability is high and it is easy to walk. The present invention provides a flooring material system for absorbing impact, the flooring material system being characterized by including foundation materials arranged to be used, each of the foundation materials including a top portion layer and a lower portion layer each having a surface substantially parallel to a ground, and a plurality of leg portions with an impact buffer capability, and a distribution material arranged to distribute force applied to the foundation material.

4 Claims, 25 Drawing Sheets

(51) Int. Cl.
  B32B 21/04   (2006.01)
  B32B 25/12   (2006.01)
  E04B 5/02    (2006.01)
  E04F 15/02   (2006.01)
  E04F 15/10   (2006.01)

(52) U.S. Cl.
  CPC .......... *E04B 5/02* (2013.01); *E04F 15/02177* (2013.01); *E04F 15/107* (2013.01); *E04F 15/22* (2013.01); *B32B 2307/56* (2013.01); *B32B 2307/732* (2013.01); *B32B 2419/04* (2013.01)

(56) References Cited

U.S. PATENT DOCUMENTS

| | | | | |
|---|---|---|---|---|
| 4,879,857 | A * | 11/1989 | Peterson | E04F 15/225 52/480 |
| 5,542,221 | A | 8/1996 | Streit | |
| 5,647,183 | A * | 7/1997 | Counihan | E04F 15/22 52/480 |
| 6,230,460 | B1 * | 5/2001 | Huyett | E04F 15/225 52/480 |
| 6,363,675 | B1 * | 4/2002 | Shelton | E04F 15/225 52/302.1 |
| 8,099,915 | B2 * | 1/2012 | Moller, Jr. | E01C 11/24 52/177 |
| 10,851,863 | B2 | 12/2020 | Betteridge | |
| 2002/0108340 | A1 * | 8/2002 | Elliott | E04F 15/225 52/480 |
| 2003/0070376 | A1 * | 4/2003 | Abraham | E04F 15/225 52/480 |
| 2009/0211192 | A1 * | 8/2009 | Valentine | F16F 1/44 52/480 |
| 2010/0236176 | A1 * | 9/2010 | Jenkins | E01C 5/20 52/582.1 |
| 2011/0056158 | A1 * | 3/2011 | Moller, Jr. | E04F 15/022 52/403.1 |
| 2011/0135852 | A1 * | 6/2011 | Sawyer | E01C 3/06 428/17 |
| 2012/0117906 | A1 * | 5/2012 | Moller, Jr. | E04F 15/225 29/436 |
| 2014/0190103 | A1 * | 7/2014 | Sawyer | E01C 13/04 52/302.1 |
| 2015/0225965 | A1 * | 8/2015 | Moller, Jr. | E04F 15/22 52/403.1 |
| 2018/0202150 | A1 * | 7/2018 | Downey | B32B 27/365 |
| 2019/0338512 | A1 * | 11/2019 | Downey | B32B 27/365 |

FOREIGN PATENT DOCUMENTS

| | | | | |
|---|---|---|---|---|
| DE | 2623321 | A1 | 12/1977 | |
| DE | 4437155 | A1 * | 4/1996 | |
| EP | 0835969 | A2 * | 4/1998 | |
| JP | S55108135 | U | 7/1980 | |
| JP | 05280179 | A * | 10/1993 | ............. G01R 15/12 |
| JP | 06322953 | A * | 11/1994 | |
| JP | H0826459 | A * | 1/1996 | ............. B65G 45/12 |
| JP | 2002285700 | A * | 10/2002 | |
| JP | 2002285700 | A | 10/2002 | |
| JP | 3108982 | U * | 4/2005 | ............. E04F 15/18 |
| JP | 3108982 | U | 4/2005 | |
| JP | 2009008167 | A | 1/2009 | |
| JP | 2019525783 | A | 9/2019 | |
| JP | 2019178519 | A | 10/2019 | |
| KR | 20100033765 | A * | 2/2010 | |
| KR | 20120065843 | A * | 6/2012 | |
| KR | 20150091579 | A | 8/2015 | |
| KR | 101879377 | B1 * | 8/2018 | |
| WO | 2019164177 | A1 | 8/2019 | |

OTHER PUBLICATIONS

Andrew C.Laing et al.,"Low stiffness floors can attenuate fall-related femoral impact forces by up to 50% without substantially impairing balance in older women",Accident Analysis and Prevention 41 (2009), pp. 642?650.

Smartcells, HP (https://www.smartcellsusa.com) ,Date of first access: March of 2019.

Extended European Search Report for counterpart European Application No. 20894474.4, issued by the European Patent Office dated Dec. 7, 2022.

Office Action issued for counterpart Japanese Application No. 2021-561587, issued by the Japanese Patent Office dated Jan. 31, 2023 (drafted on Jan. 26, 2023).

Office Action issued for counterpart Chinese Application 202080079807.2, issued by The State Intellectual Property Office of People's Republic of China dated Jul. 29, 2023.

* cited by examiner

| UNIT (N) | FIRST TIME | SECOND TIME | THIRD TIME | MEAN | STANDARD DEVIATION |
|---|---|---|---|---|---|
| FLOORING | 7479 | 8129 | 6574 | 7394 | 781 |
| SPONGE | 7718 | 7519 | 7342 | 7526 | 188 |
| PATENT DOCUMENT 2 | 3678 | 3846 | 3748 | 3757 | 84 |
| TEST FLOORING MATERIAL UNIT | 2842 | 3361 | 2244 | 2816 | 559 |

FIG.15

| UNIT (N) | MEAN | LOAD APPLIED TO THIGHBONE SURFACE (70% OF LOAD APPLIED TO BODY SURFACE) | MAGNIFICATION RATIO TO 2000 N |
|---|---|---|---|
| FLOORING | 7394 | 5176 | 2.6 |
| SPONGE | 7526 | 5268 | 2.6 |
| PATENT DOCUMENT 2 | 3757 | 2630 | 1.3 |
| TEST FLOORING MATERIAL UNIT | 2674 | 1872 | 0.9 |

FIG.17

| UNIT (N) | FIRST TIME | SECOND TIME | THIRD TIME | MEAN | STANDARD DEVIATION |
|---|---|---|---|---|---|
| POSITION 126 | 2844 | 2882 | 2297 | 2674 | 327 |
| POSITION 127 | 1737 | 1743 | 1690 | 1723 | 29 |
| POSITION 128 | 1667 | 1589 | 1617 | 1624 | 40 |

FIG.20

| UNIT (N) | FIRST TIME | SECOND TIME | THIRD TIME | MEAN | STANDARD DEVIATION |
|---|---|---|---|---|---|
| POSITION 129 | 2844 | 2882 | 2297 | 2674 | 327 |
| POSITION 130 | 2533 | 2470 | 1980 | 2328 | 303 |
| POSITION 131 | 2426 | 2241 | 1910 | 2192 | 261 |

FIG.22

| | DEPRESSION AMOUNT (mm) |
|---|---|
| JOINT MAT | 8.8 |
| PATENT DOCUMENT 2 | 16.2 |
| TEST FLOORING MATERIAL UNIT | 1.8 |

*FIG.24*

ABSTRACT# FLOORING MATERIAL SYSTEM

The contents of the following Japanese patent application(s) are incorporated herein by reference:
NO. 2019-217550 filed in JP on Nov. 29, 2019
NO. PCT/JP2020/044411 filed in WO on Nov. 30, 2020

BACKGROUND

1. Technical Field

The present invention relates to a flooring material system for absorbing impact.

2. Related Art

In recent years, a mat or a flooring material for absorbing impact has been proposed to avoid an injury when a patient, an elderly person, or the like falls.

Patent document 1 discloses a flooring material using a simple composition with which excellent impact absorbability and wheel running performance are secured, and furthermore, walkability is excellent.

In addition, Patent document 2 discloses a system arranged to damp applied force and absorb impact energy.

Patent document 1: Japanese Patent Application Publication No. 2019-178519

Patent document 2: Japanese translation publication of a PCT route patent application No. 2019-525783

According to a technique disclosed in Patent document 1, a polyurethane foam layer is included in a structure, with which impact is absorbed. A modulus of elasticity of such a foam material is linear with respect to applied force, and when a hardness at which stable walk can be performed is maintained, it is not possible to absorb sufficient impact at the time of falling. In addition, since a thickness of a cushion layer with which stable walk can be performed is thin, hitting the bottom tends to occur at the time of falling.

A technique disclosed in Patent document 2 may overcome an issue of the technique disclosed in Patent document 1, but has been developed for a purpose of anti-fatigue, recreation, or the like, and it can not necessarily be said that a sufficient impact absorption capability is provided to avoid an injury when a patient, an elderly person, or the like falls.

The present invention has been made in view of the above described circumstances, and is aimed at providing a flooring material system capable of exerting a high impact absorption capability at the time of falling while at the time of walking, a stability is high and it is easy to walk.

General Disclosure

A flooring material system for absorbing impact is provided, the flooring material system being characterized by including foundation materials arranged to be used, each of the foundation materials including a top portion layer and a lower portion layer each having a surface substantially parallel to a ground, and a plurality of leg portions with an impact buffer capability, and a distribution material arranged to distribute force applied to the foundation material.

Effect of the Invention

According to an aspect of the present invention, the flooring material system for absorbing impact can be provided.

BRIEF DESCRIPTION OF THE DRAWINGS

FIG. 15 is a diagram illustrating a result of a review of an impact absorption capability.

FIG. 17 illustrates a degree of the impact absorption capability.

FIG. 20 is a diagram illustrating a result of a review of the impact absorption capability depending on the positions where the impact is received.

FIG. 22 is a diagram illustrating a result of a review of an effect of the distribution material 201, the distribution material 202, the distribution material 203, and the distribution material 204.

FIG. 24 is a diagram illustrating a result of a review of a depression amount of a flooring material.

DESCRIPTION OF EXEMPLARY EMBODIMENTS

Contents of embodiments of the present invention will be listed and described. The present invention includes the following configurations.

[Item 1]

A flooring material system for absorbing impact, the flooring material system being characterized by including
foundation materials arranged to be used, each of the foundation materials including a top portion layer and a lower portion layer each having a surface substantially parallel to a ground, and a plurality of leg portions with an impact buffer capability, and
a distribution material arranged to distribute force applied to the foundation material.

[Item 2]

The flooring material system according to Item 1, characterized in that the leg portions are arranged at four corners of the foundation material.

[Item 3]

The flooring material system according to Item 1 or 2, characterized in that the leg portion buckles when certain force or more is applied thereto in a vertical direction.

[Item 4]

The flooring material system according to any one of Items 1 to 3, characterized in that the leg portion includes a groove on one side.

[Item 5]

The flooring material system according to any one of items 1 to 4, characterized in that the distribution material includes
a first distribution material installed across two adjacent foundation materials, and
a second distribution material arranged across four adjacent foundation materials.

Detail of Embodiment

Hereinafter, an embodiment of the present invention will be described with reference to the drawings.

(Outline)

Figure 1:
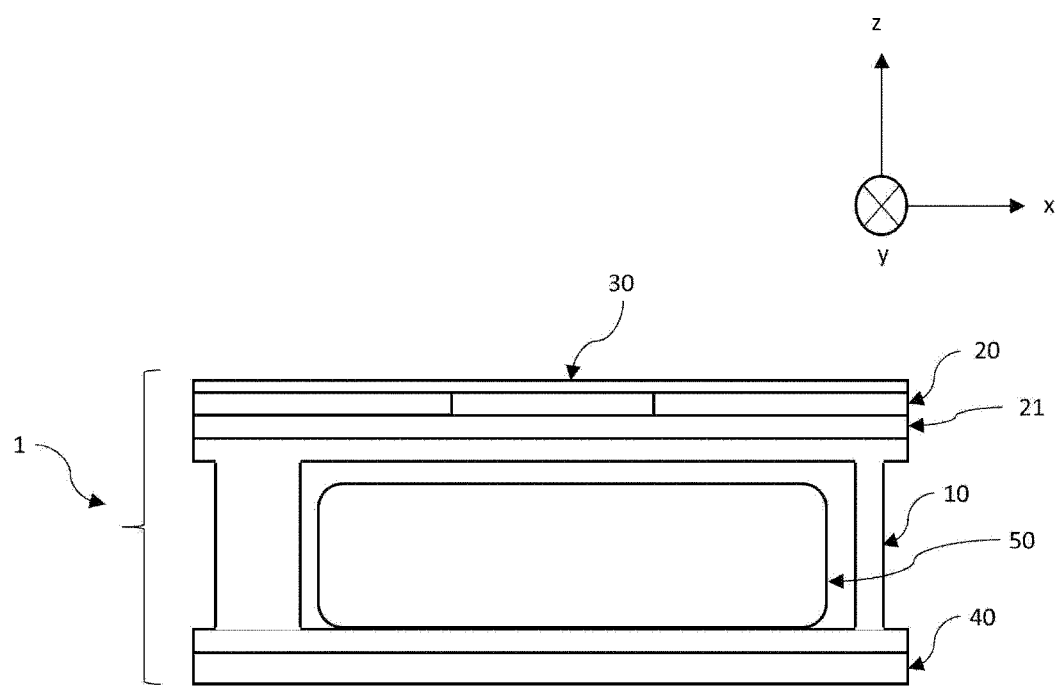
FIG. 1 illustrates an overall image of a flooring material system 1.

A flooring material system 1 according to an embodiment of the present invention includes a plurality of layers with different functions. FIG. 1 is a side view of the flooring material system 1, and illustrates a configuration of one unit of the flooring material system 1.

The flooring material system 1 includes a foundation material 10 having a main function of absorbing impact, a distribution material 20 and a distribution material 21 arranged to distribute the impact to several foundation materials, a surface layer material 30 located in a top portion and arranged to increase walkability, and a lower layer material 40 located below the foundation material 10 and arranged to stabilize the foundation material 10. In addition, a buffer material 50 may be provided in a space between the foundation materials 10.

The foundation material 10 is a noble structural body also individually having an impact absorption capability, and when a plurality of the foundation materials 10 are disposed and installed, the impact absorption capability is exerted in an installation range.

Figure 21:
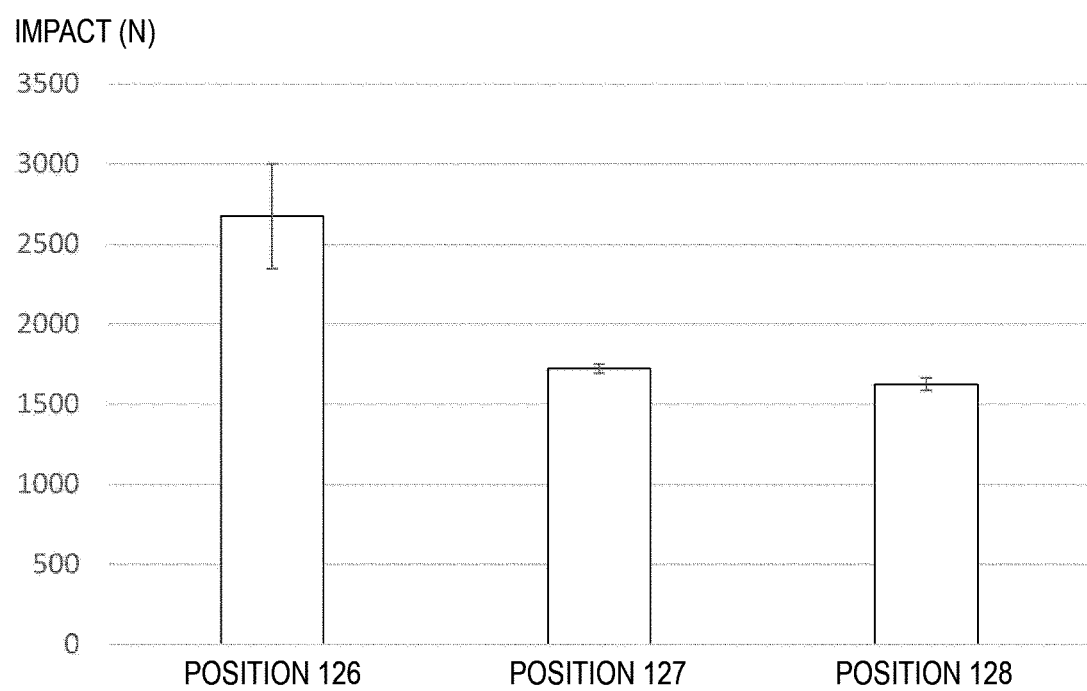
FIG. 21 is another diagram illustrating the result of the review of the impact absorption capability depending on the positions where the impact is received.

However, as illustrated in FIG. 20 and FIG. 21, when the foundation materials 10 are simply paved, an issue occurs that an expected impact absorption capability is not obtained depending on a location where force is applied. The distribution material 20 and the distribution material 21 are used to overcome this issue. When the foundation materials 10 are paved, and the distribution material 20 and the distribution material 21 are arranged thereon in a manner as will be described below, wherever the force is applied, the impact absorption capability of the foundation material 10 can be utilized in a certain range. The remaining surface layer material 30 and lower layer material 40 play a role of supplementing the functions of the foundation material 10 and the distribution material 20 and the distribution material 21.

Hereinafter, respective structures and functions of the foundation material 10, the distribution material 20 and the distribution material 21, the surface layer material 30, the lower layer material 40, and the buffer material 50 according to the present embodiment will be described.

The lower layer material 40 of the present embodiment configures a lowermost layer of the flooring material system 1, and is installed on a structural body such as a floor, the ground, or the like. Since the lower layer material 40 absorbs irregularities of an installation location, an upper surface of the lower layer material 40 is substantially parallel to an installation surface, and the lower layer material 40 realizes a function of creating an environment where the impact absorption capability of the foundation material 10 is sufficiently exerted. Any raw material, surface structure, and thickness of the lower layer material 40 may be used as long as the lower layer material 40 absorbs the irregularities of the installation surface, and the foundation material 10 installed on an upper surface of the lower layer material 40 does not slide on the lower layer material 40. In addition, in the same manner as a top portion layer 101 of the foundation material 10, the lower layer materials 40 with a square shape having a length of L1 may be used by being paved on the installation surface, or may be used over the installation surface like a sheet without being matched with a size of the foundation material 10.

Figure 2:
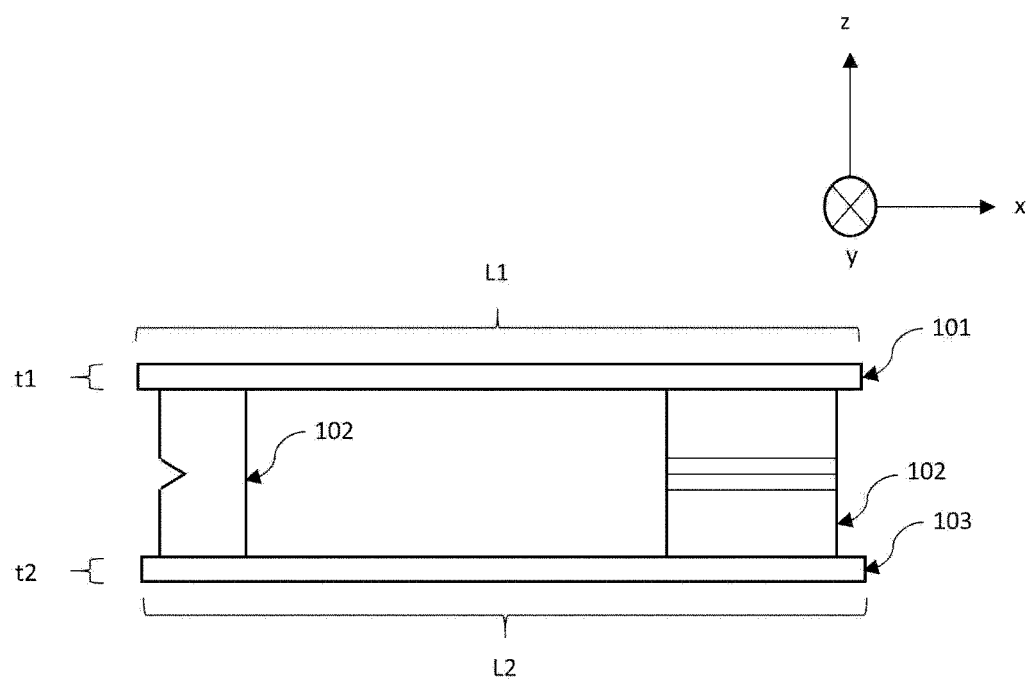
FIG. 2 is a side view of a foundation material 10.
Figure 3:
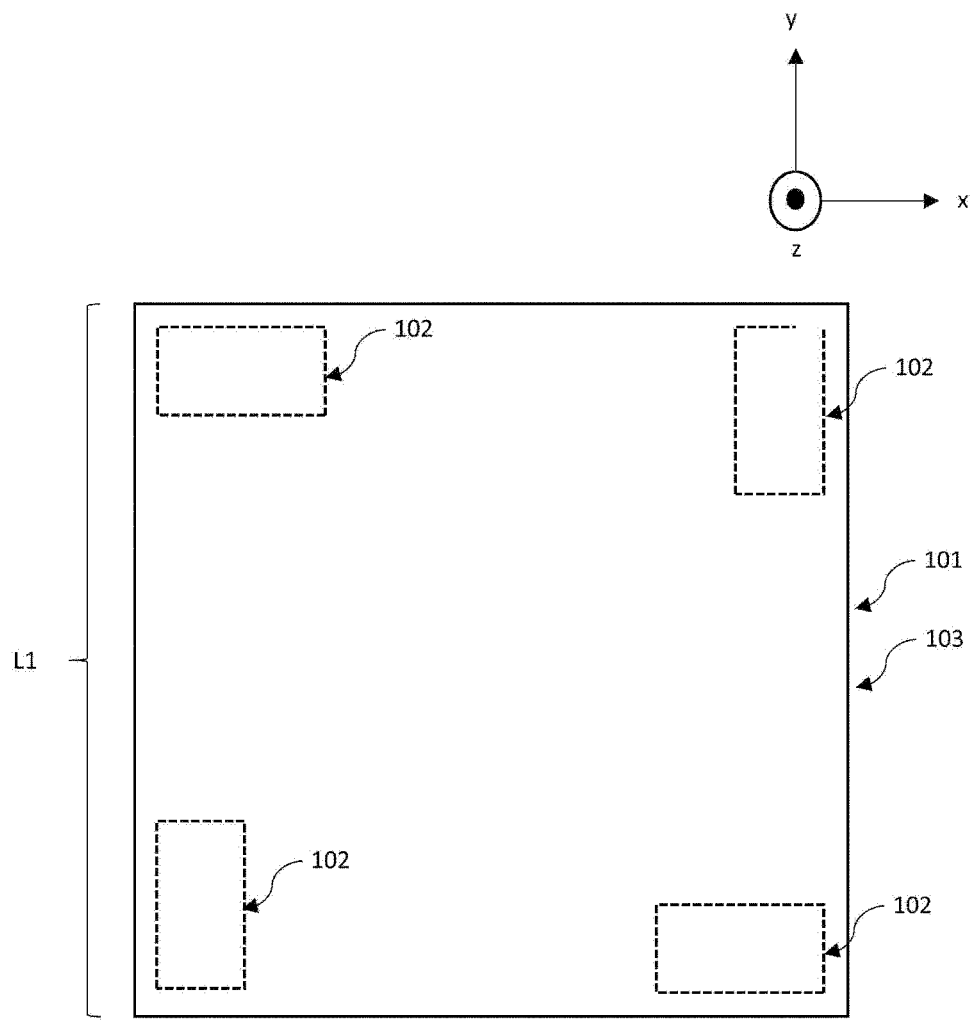
FIG. 3 is a top view of the foundation material 10.
Figure 4:
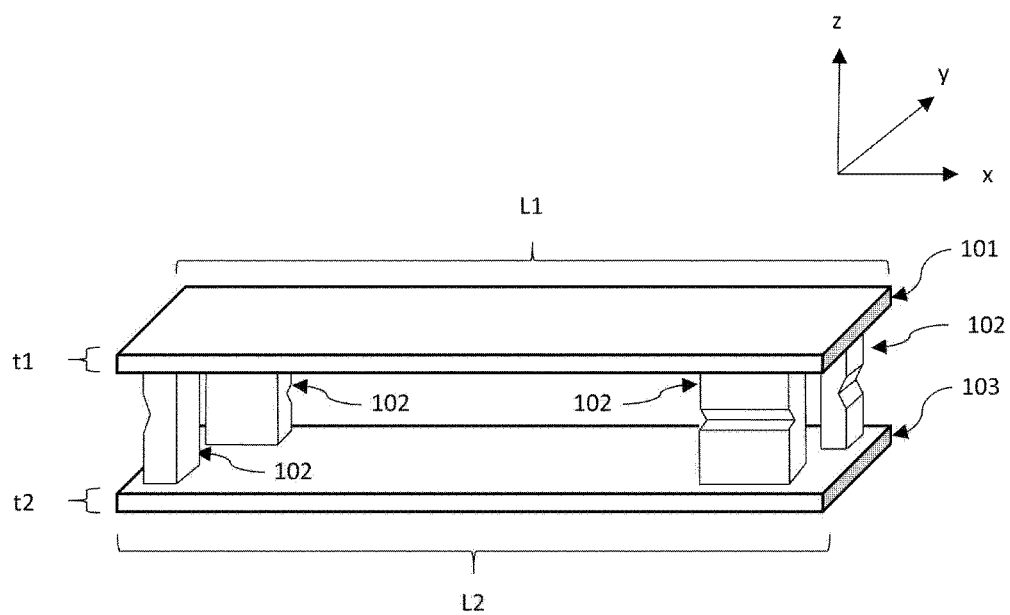
FIG. 4 is a perspective view of the foundation material 10.

FIG. 2, FIG. 3, and FIG. 4 illustrate an example of an overall structure of the foundation material 10 of the present embodiment. FIG. 2 is a side view of the foundation material 10. FIG. 3 is a top view of the foundation material 10. FIG. 4 is a perspective view of the foundation material 10. The foundation material 10 is characterized by including the top portion layer 101 arranged to receive a pressure from a walker, an installed object, or the like, a plurality of leg portions 102 having a function of absorbing impact which are below the top portion layer 101, and a lower portion layer 103 in contact with the lower layer material 40. In FIG. 3, the leg portion 102 that are not visible in actuality are illustrated by dotted lines, and since the lower portion layer 103 has a same size as the top portion layer 101, it appears that the lower portion layer 103 is not illustrated as being seen to be overlapped with the top portion layer 101.

FIG. 2, FIG. 3, and FIG. 4 illustrate an example of a structure of the top portion layer 101 of the present embodiment. The top portion layer 101 is formed of a square with one side having the length of L1, and a thickness of t1. The impact buffer capability tends to be exerted when L1 is in a range from 150 mm to 600 mm, and the impact buffer capability tends to be exerted in a range from 200 mm to 500 mm since it is not too hard, and in addition, slack due to its own weight of the top portion layer 101 is suppressed. Furthermore, when L1 is in a range from 300 mm to 400 mm, the impact buffer capability tends to be further exerted, and ease of installation is improved due to the size and the weight. Furthermore, the impact buffer capability tends to be exerted when t1 is in a range from 2 mm to 10 mm, the impact buffer capability tends to be further exerted when t1 is in a range from 2 mm to 8 mm, and the impact buffer capability tends to be still further exerted when t1 is in a range from 2 mm to 5 mm.

The top portion layer 101 is formed of NR rubber. A rubber hardness may be in a range from 10 to 100, and a balance between the impact absorption capability and the stability at the time of walking is improved in a range from 50 to 70.

Figure 5:
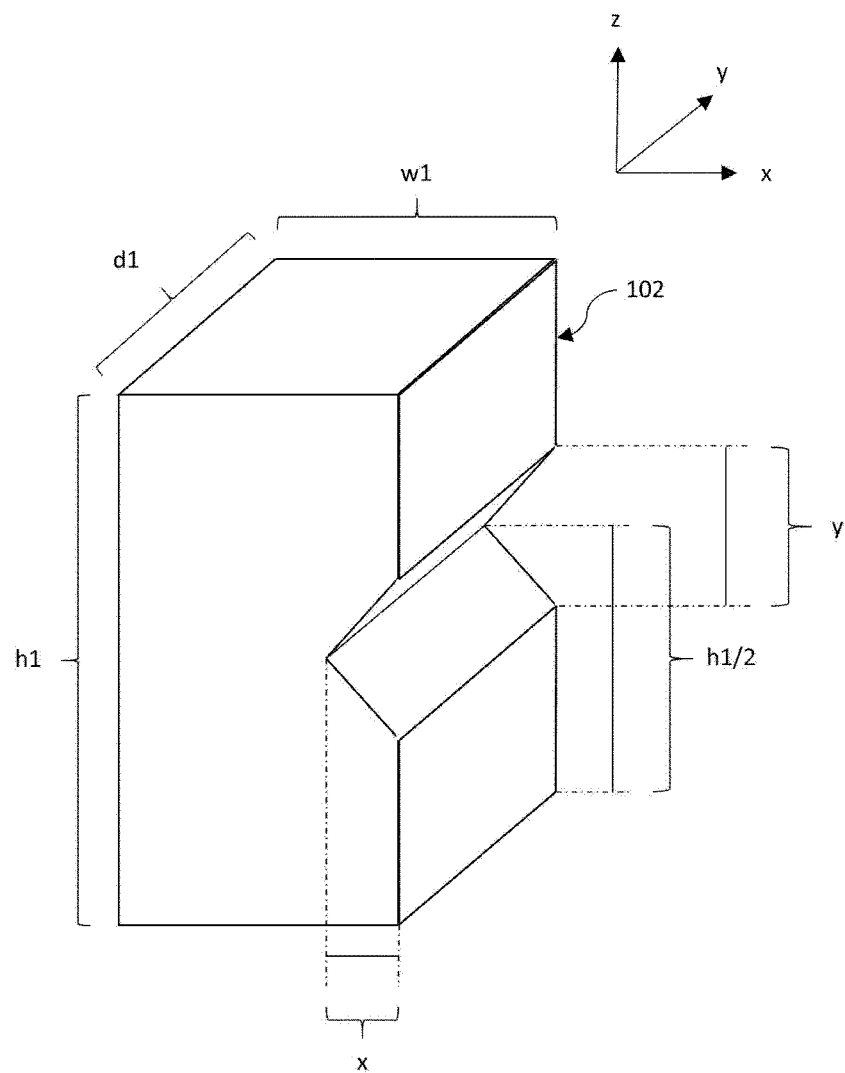
FIG. 5 illustrates a structure of a leg portion 102 in the foundation material 10.

FIG. 5 illustrates an example of a structure of the leg portion 102. The leg portion 102 has a structure with a height of h1, a width of w1, and a depth of d1. In addition, a groove is present on one side of the leg portion 102. In a range from 20 mm to 100 mm, as h1 is longer, the impact absorption capability is higher, and as h1 is shorter, it is easier to install the leg portion 102 into a construction. In addition, when h1 is from 20 mm to 50 mm, ease of installation into an already built construction is improved. In addition, d1 depends on h1 and may be in a range from h1±20 mm to 2×h1±20 mm, and specifically, when h1 is 100 mm, d1 may be 100 mm±20 mm, and when h1 is 40 mm, d1 may be 80 mm±20 mm. Furthermore, w1 depends on h1 and may be in a range from 5 mm to 20 mm, and specifically, when h1 is 100 mm, w1 may be 15 mm±5 mm, and when h1 is 40, w1 may be 10 mm±5 mm.

The above described groove included in the leg portion 102 has a structure with a depth of x and a width of y while a position at h1/2 from a bottom portion of the leg portion 102 is set as a center. Herein, x depends on h1 and may be in a range from 1 mm to 10 mm, and specifically, when h1 is 100 mm, x may be 5 mm±4 mm, and when h1 is 40 mm, x may be 3 mm±2 mm. In addition, y depends on h1 and may be from 5 mm to 300 mm, and specifically, when h1 is 100 mm, y may be 20 mm±10 mm, and when h1 is 40 mm, y may be 10 mm 5 mm.

Note that according to the present embodiment, h1, w1, d1, x, and y have been described while it is assumed that a person weighing 60 kg to 70 kg walks, and may be changed for different body weights to be targeted. For example, as an example, in a case where use is considered in a same facility, while h1 is fixed, when the body weight of a target person is heavier than 70 kg, w1 may be lengthened, and x may be shortened, and in addition, when the body weight of a target person is lighter than 60 kg, w1 may be shortened, and x may be lengthened.

The leg portion 102 is formed of NR rubber or elastomer. A rubber hardness may be in a range from 10 to 100, and the balance between the impact capability and the stability at the time of walking is improved in a range from 50 to 70.

Figure 6:
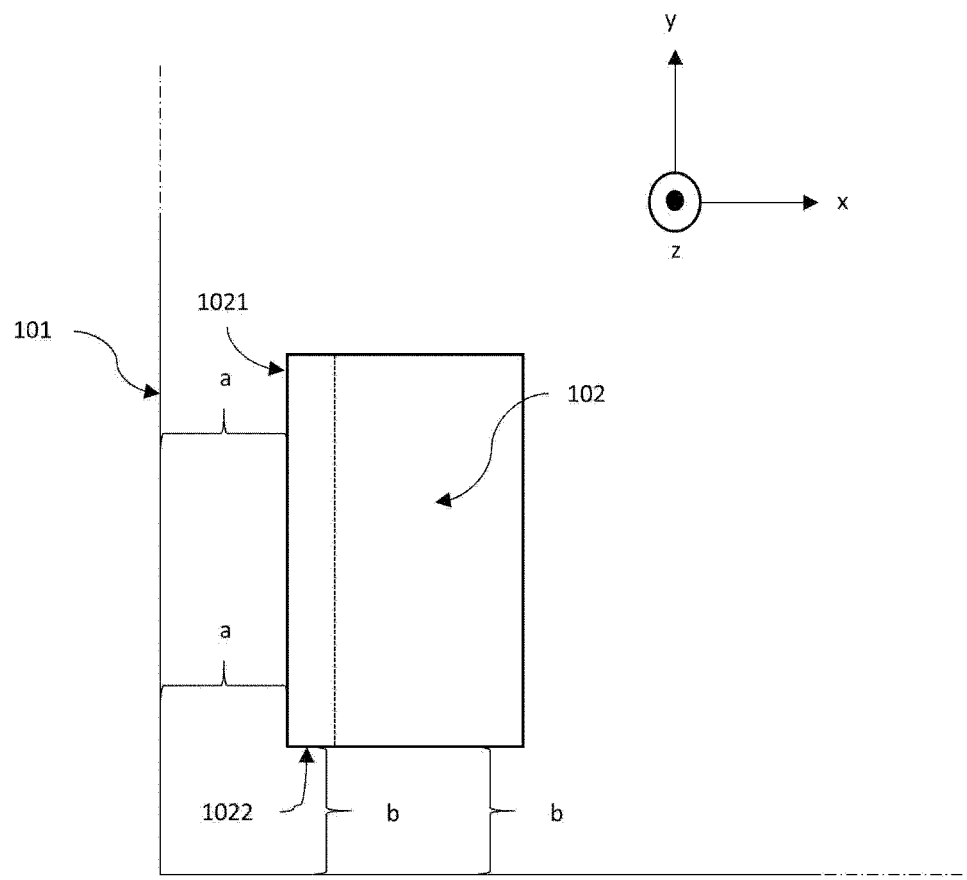
FIG. 6 illustrates a position of the leg portion 102 in the foundation material 10.

FIG. 6 illustrates an example of a position of the leg portion 102 in the foundation material 10. FIG. 6 illustrates one corner of the foundation material 10 as seen directly from the above, and under normal circumstances, the leg portion 102 is not visible but is illustrated for convenience of the description. In addition, the entirety of the foundation material 10 is not illustrated in FIG. 6, and the continuation is represented by dotted lines. The leg portions 102 are arranged in four corners of the top portion layer 101. The side where the above described groove is present is referred to as a surface 1021, and a side close to a verge of the top portion layer 101 among the remaining sides is referred to as a surface 1022. The leg portion 102 is arranged in a position where distances between the verge of the top portion layer 101 and the surface 1021 and the surface 1022 are respectively a and b. At this time, a length of a may be from 1 mm to 10 mm, and when the length is 2 mm to 5 mm, fluctuation of an impact absorption performance for each location is decreased. In addition, a length of b may be from 1 mm to 10 mm, and when the length is from 2 mm to 5 mm, the fluctuation of the impact absorption performance for each location is decreased.

An orientation of the leg portion 102 is clarified in FIG. 2 and FIG. 4. The above described groove heads to an outer side of the top portion layer 101.

FIG. 2 illustrates an example of a structure of the lower portion layer 103 of the present embodiment. The lower portion layer 103 is formed of a square with one side having a length of L2, and a thickness of t2. The impact buffer capability tends to be exerted when L2 is in a range from 150 mm to 600 mm, and the impact buffer capability tends to be exerted in a range from 200 mm to 500 mm. Furthermore, the impact buffer capability tends to be further exerted when L2 is in a range from 300 mm to 400 mm, and ease of installation is improved due to the size and the weight. Furthermore, the impact buffer capability tends to be exerted when t2 is in a range from 2 mm to 10 mm, the impact buffer capability tends to be further exerted when t2 is in a range from 2 mm to 8 mm, and the impact buffer capability tends to be still further exerted when t2 is in a range from 2 mm to 5 mm.

The lower portion layer 101 is formed of NR rubber or elastomer. A rubber hardness may be in a range from 10 to 100, and the impact absorption capability is further increased in a range from 50 to 70.

The leg portion 102 may be integrally coupled to the top portion layer 101 and the lower portion layer 103, a bottom portion of the top portion layer 101 and a top portion of the leg portion 102 and also a top portion of the lower portion layer 103 and a bottom portion of the leg portion 102 may be fixed to each other by binding or using a component, or the bottom portion of the top portion layer 101, the top portion and the bottom portion of the leg portion 102, and the top portion of the lower portion layer 103 may be provided with male and female structures and fixed by being fitted with each other.

Figure 7:
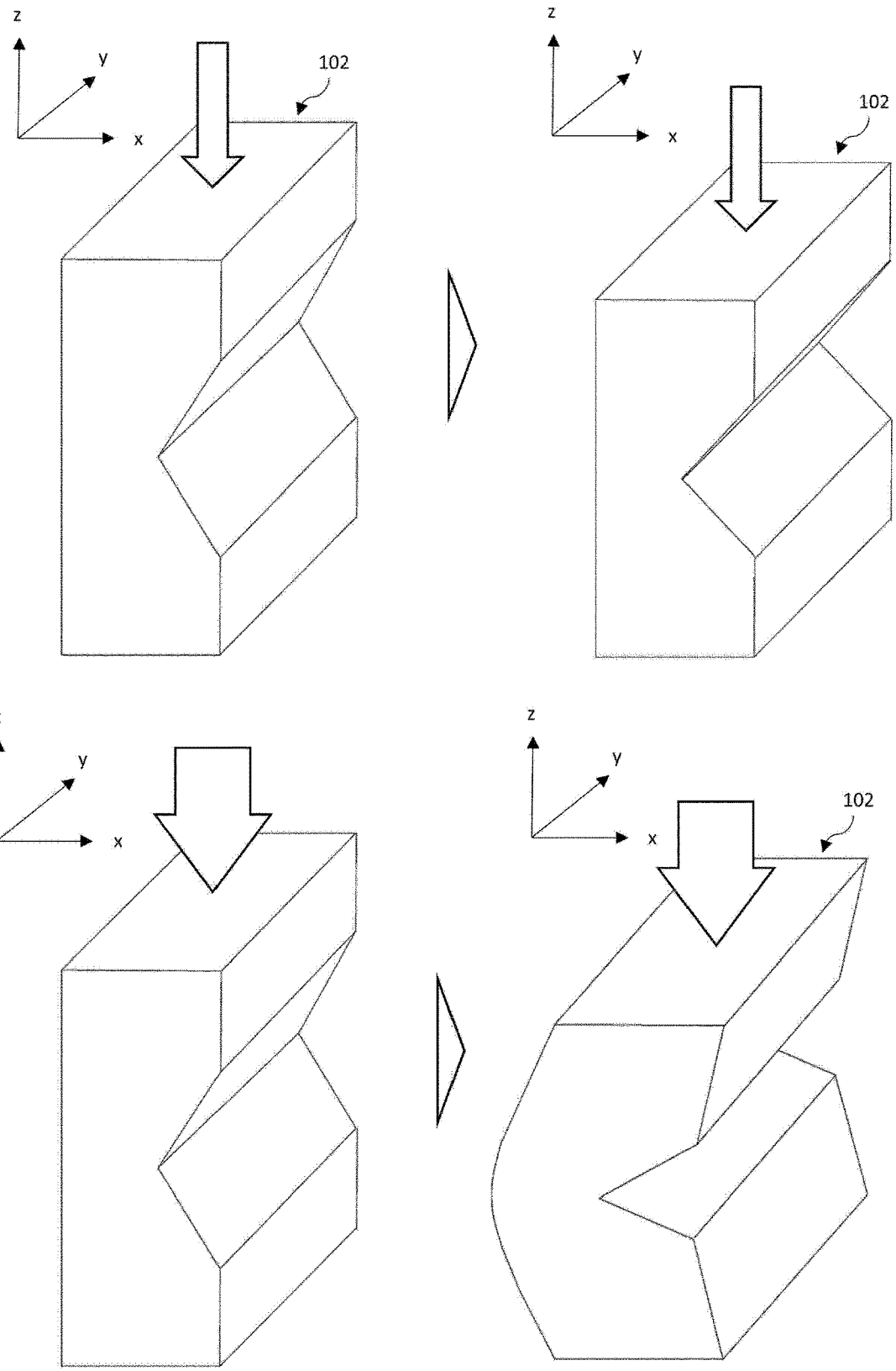
FIG. 7 illustrates a movement of the leg portion 102 when impact is applied from the above to the leg portion 102 in the foundation material 10.

A feature of the leg portion 102 will be described by using FIG. 7. When impact is applied to the top portion of the leg portion 102 in a downward vertical direction, the leg portion 102 buckles under around 1000 N such that a side on an opposite side to the groove of the leg portion 102 projects. The leg portion 102 absorbs the impact by vertically shrinking up to around 1000 N, and when force around 1000 N or more is applied, the leg portion 102 buckles to absorb the impact. Since the leg portion 102 has a dual mechanism to absorb the impact, it is easy to walk at the time of normal walking, and the impact can be absorbed by buckling when high force is applied at the time of falling or the like.

The distribution material 21 of the present embodiment is installed between the foundation material 10 and the distribution material 20. Since the foundation material 10 uses rubber or the like having a certain degree of deformability as a material, by installing the distribution material 21 having a certain hardness on the foundation material 10, slack of a central portion of the foundation material 10 due to its own weight of the top portion layer 101 is avoided, and in addition, when force is applied to the top portion layer 101 of the foundation material 10 too, a function of distributing the force to the four leg portions 102 of the foundation material 10 is realized. Furthermore, the distribution material 21 has a function of receiving force over a wide area. A thickness of the distribution material 21 of the foundation material 10 may be from 2 mm to 12 mm, and any raw material or surface structure may be used as long as the raw material has a hardness with which, when force is applied to the central portion of the foundation material 10, the force can be distributed to the four legs. As the raw material of the distribution material 21, for example, a wood material, resin, plastic, metal, or the like may be used.

Figure 8:
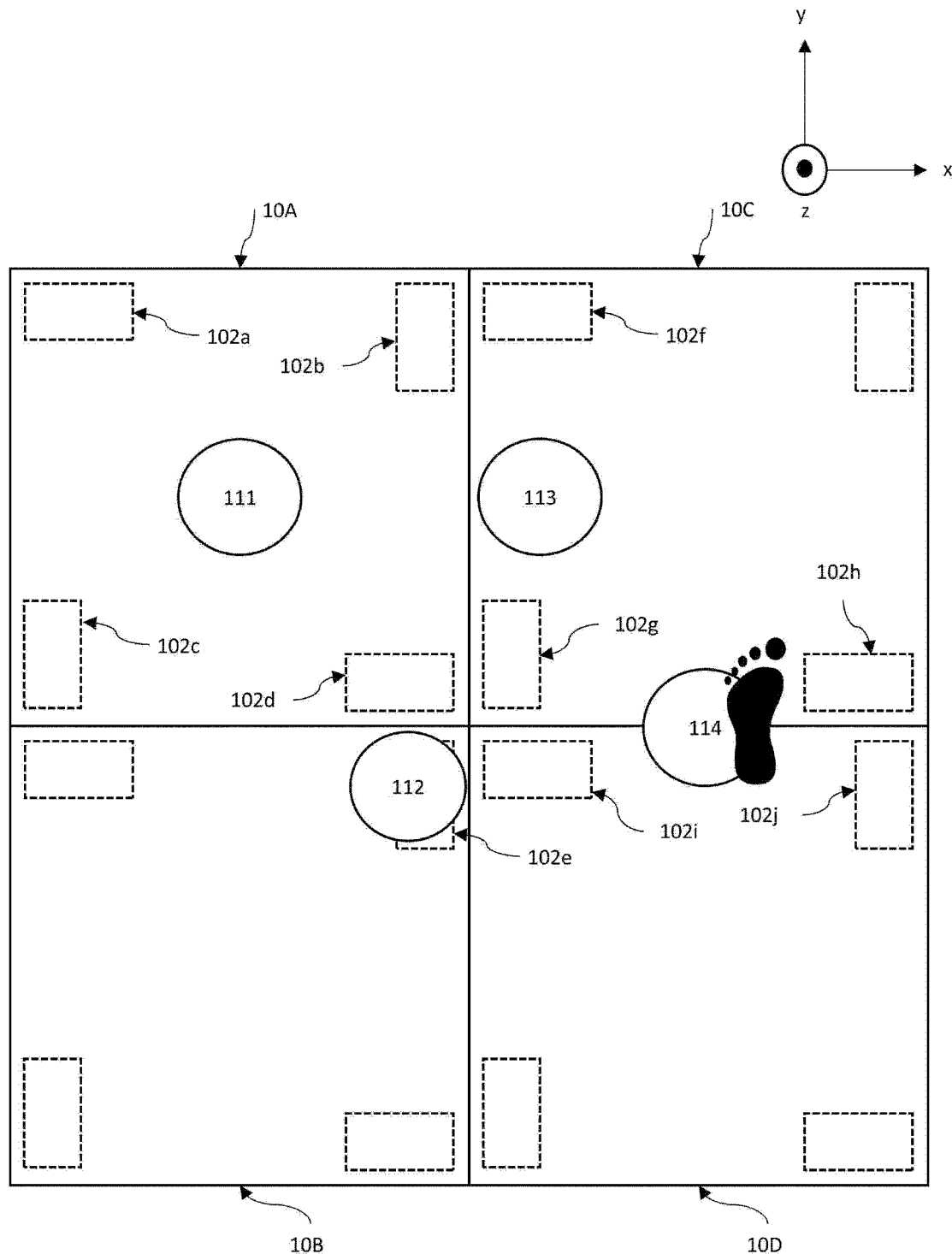
FIG. 8 is a top view of an arrangement of four sets in each of which the foundation material 10 is placed on a lower layer material 40, and a distribution material 21 is further placed thereon, and illustrates positions where force is applied.

The distribution material 20 is a component necessary for maximizing the balance between the impact absorption capability of the foundation material 10 and the stability at the time of walking. First, the foundation materials 10 are used by being paved. However, when the foundation materials 10 are simply disposed, coupling between the adjacent foundation materials 10 is absent, and there is a bias on the leg portion 102 to be applied with force depending on a site where the force is applied, and as a result, a difference occurs in the impact absorption capability, and it is not possible to exert the stable function. FIG. 8 is a top view of an arrangement of four sets in each of which the foundation material 10 is placed on the lower layer material 40, and the distribution material 21 is further placed thereon, and for convenience of the description, illustrations of the lower layer material 40 and the distribution material 21 are omitted. For example, when force is applied to a position 111 of FIG. 8, due to the effect of the distribution material 21, the force is approximately uniformly applied to four leg portions including a leg portion 102a, a leg portion 102b, a leg portion 102c, and a leg portion 102d, and the expected impact absorption capability can be obtained. However, for example, when force is applied to a position 112 of FIG. 6, the force is disproportionately applied to a leg portion 102e located directly below, and it is not possible to obtain the expected impact absorption capability. In addition, for example, in a position 113 too, force is disproportionately applied to two leg portions including a leg portion 102f and a leg portion 102g, and it is not possible to obtain the expected impact absorption capability. Furthermore, also when force is applied to a position across a plurality of the foundation materials 10 as in a position 114, for example, since a foundation material 10A is not coupled to a foundation material 10B, it is not necessary a case where the force can be appropriately distributed to the leg portion 102g, a leg portion 102h, a leg portion 102i, and a leg portion 102j. This is because, at the time of walking, for example, the position 114 is stomped by a foot as indicated by a footprint in FIG. 6, and in this case, large force is applied to a heel part, that is, a foundation material 10D, so that the force is disproportionately applied to the leg portion 102i and the leg portion 102j. The distribution material 20 is used to overcome this issue, and has a function of distributing force to the four leg portions 102 of the two or four adjacent foundation materials 10.

The distribution material 20 is classified into four types including a distribution material 201, a distribution material 202, a distribution material 203, and a distribution material 204. The distribution material 201, the distribution material 202, the distribution material 203, and the distribution material 204 are paved, are therefore required not to be in contact with each other, and required to have a same thickness. Note that a connection portion has a structure to be easily bent, and when the same effect can be obtained as in a case where each of the distribution materials is separated, the distribution material 201, the distribution material 202, the distribution material 203, and the distribution material 204 may be integrated with each other.

Figure 9:
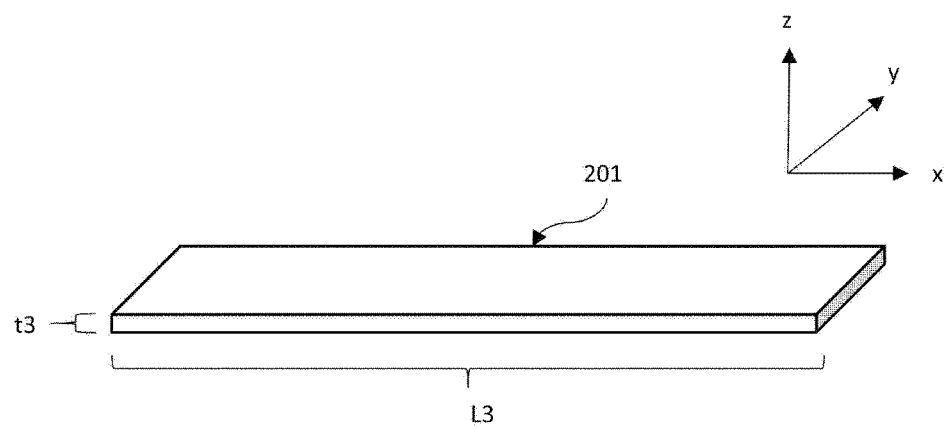
FIG. 9 illustrates a structure of a distribution material 201.

FIG. 9 illustrates an example of a structure of the distribution material 201. According to the present embodiment, the distribution material 201 is a square with one side having a length of L3, and has a structure with a thickness of t3. L3 depends on L1 in the foundation material 10, and is in a range of (L1/2)±20 mm and sufficient if it is not in contact with the distribution material 202. Herein, t3 may be in a range from 2 mm to 5 mm.

Figure 10:
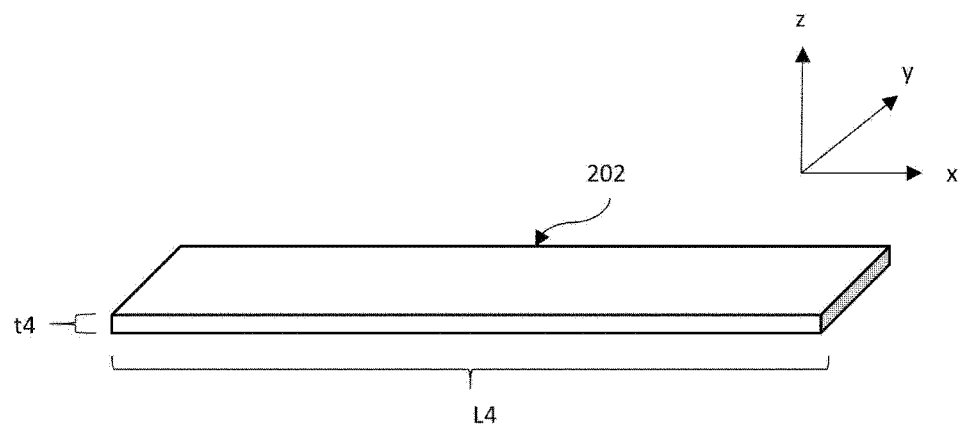
FIG. 10 illustrates a structure of a distribution material 202.

FIG. 10 illustrates an example of a structure of the distribution material 202. According to the present embodiment, the distribution material 202 is a square with one side having a length of L4, and has a structure with a thickness of t4. L4 depends on L1 in the foundation material 10, and is in a range of (L1/2)±20 mm and sufficient if it is not in contact with the distribution material 201. Herein, t4 may be in a range from 2 mm to 5 mm.

Figure 11:
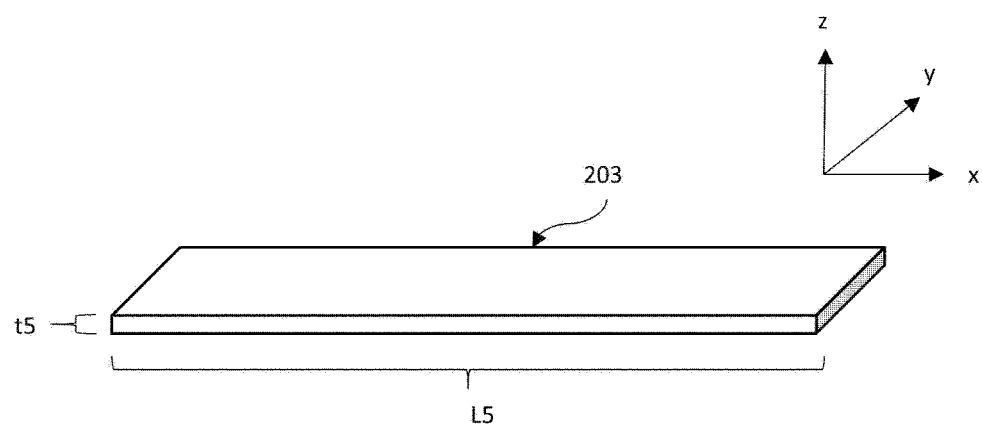
FIG. 11 illustrates a structure of a distribution material 203.

FIG. 11 illustrates an example of a structure of the distribution material 203. According to the present embodiment, the distribution material 203 is a square with one side having a length of L5, and has a structure with a thickness of t5. L5 depends on L1 in the foundation material 10, and is in a range of (L1/4)×√2±10 mm and sufficient if it is not in contact with the distribution material 202 and the distribution material 204. Herein, t5 may be in a range from 2 mm to 5 mm.

Figure 12:
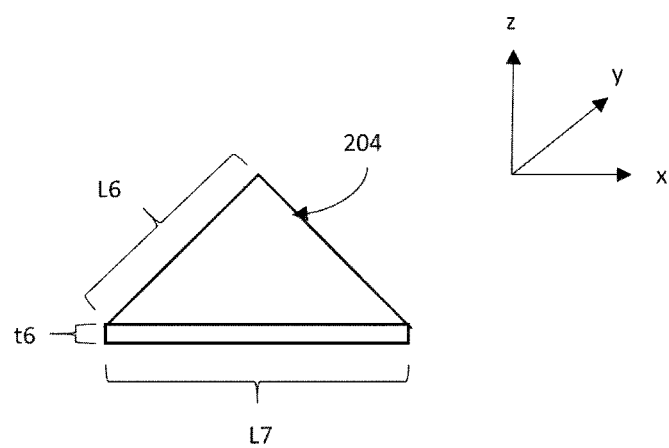
FIG. 12 illustrates a structure of a distribution material 204.

FIG. 12 illustrates an example of a structure of the distribution material 204. According to the present embodiment, the distribution material 204 is a rectangular equilateral triangle with one side having a length of L6 where a length of a base is L7, and has a structure with a thickness of t6. L6 depends on L1 in the foundation material 10, and is in a range of (L1/4)±10 mm and sufficient if it is not in contact with the distribution material 202 and the distribution material 203. L7 depends on L1 in the foundation material 10, and is in a range of (L1/4)×√2±10 mm and sufficient if it is not in contact with the distribution material 202. Herein, t6 may be in a range from 2 mm to 5 mm.

Figure 13:
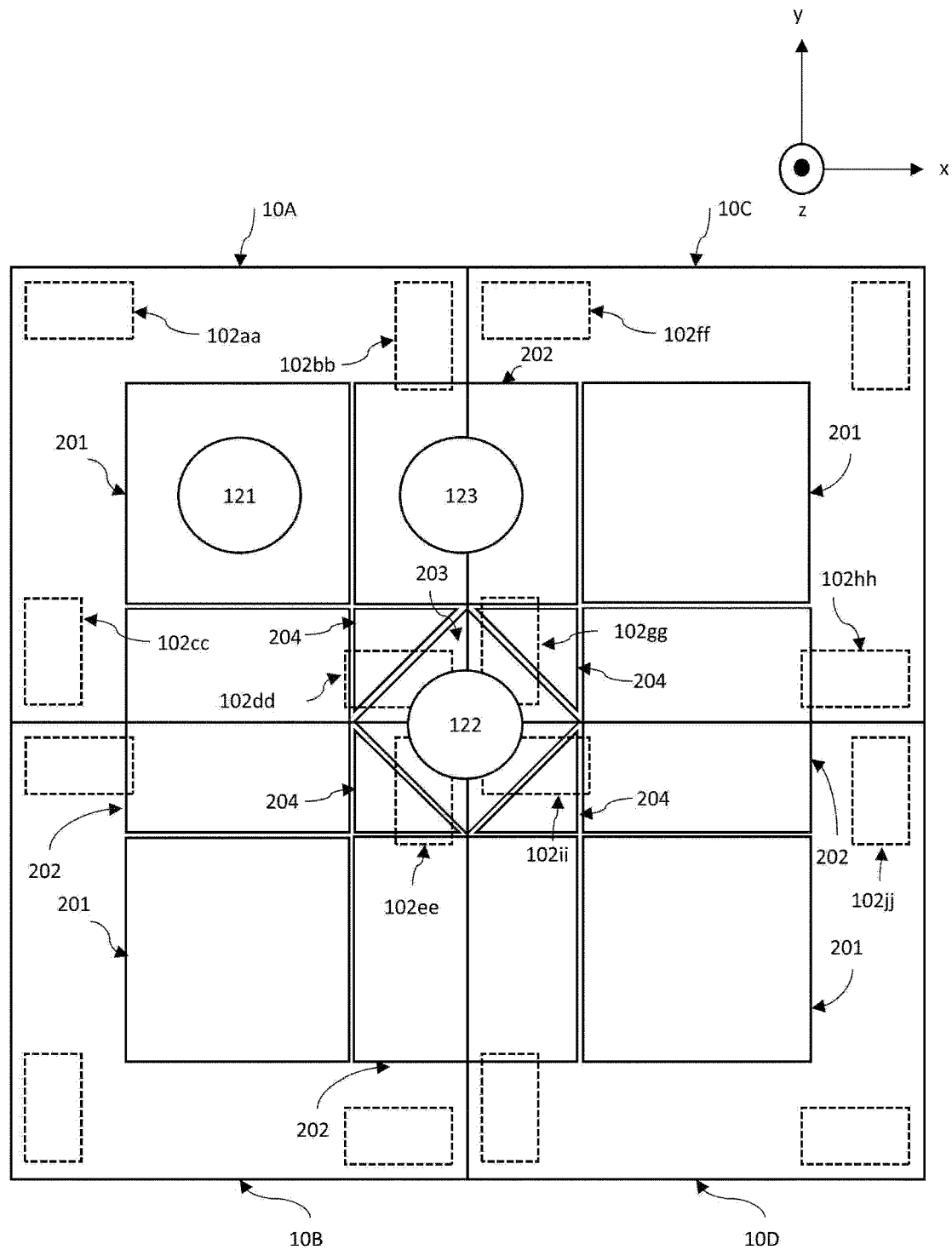
FIG. 13 is a top view of an arrangement of four sets in each of which the foundation material 10 is placed on the lower layer material 40, the distribution material 21 is further placed thereon, and the distribution material 201, the distribution material 202, the distribution material 203, and the distribution material 204 are further placed thereon, and illustrates positions where force is applied.

FIG. 13 is a top view of an arrangement of four sets in each of which the foundation material 10 is placed on the lower layer material 40, the distribution material 21 is further placed thereon, and the distribution material 201, the distribution material 202, the distribution material 203, and the distribution material 204 are further placed thereon, and for convenience of the description, illustrations of the lower layer material 40 and the distribution material 21 are omitted, and also the distribution material 201, the distribution material 202, the distribution material 203, and the distribution material 204 are represented to be transparent. As an example, by using FIG. 10, positions of the distribution material 201, the distribution material 202, the distribution material 203, and the distribution material 204 will be described. The distribution material 201 is located in a central portion of the foundation material 10. The distribution material 202 is located so as to be across the two adjacent foundation materials 10. The distribution material 203 is located so as to be across the four adjacent foundation materials 10. The distribution material 204 is arranged in a space generated when the distribution material 202 and the distribution material 203 are installed in the manner as described above. Note that as an example, FIG. 10 illustrates a manner of an arrangement of each of the distribution materials in a case where the four foundation materials 10 are disposed, and a contact point thereof is set as a center. In actuality, it is assumed that four or more of the foundation materials 10 are disposed, and in this case, similarly as in FIG. 10, the distribution material 201, the distribution material 202, the distribution material 203, and the distribution material 204 are arranged while the contact point of the four adjacent foundation materials 10 is set as the center.

For example, when force is applied to a position 121 in FIG. 13 as an example, the force is transmitted to the top portion layer 101 of the foundation material 10 through the distribution material 201 and the one distribution material 21 below the distribution material 201, and further distributed to a leg portion 102aa, a leg portion 102bb, a leg portion 102cc, and a leg portion 102dd. In addition, when force is applied to a position 122 in FIG. 13, the force is distributed to the leg portion 102dd, a leg portion 102ee, leg portion 102gg, and leg portion 102ii through the distribution material 203 and the four distribution materials 21 below the distribution material 203. Furthermore, when force is applied to a position 123 in FIG. 13, the force is distributed to the leg portion 102bb, the leg portion 102dd, a leg portion 102ff, and the leg portion 102gg through the distribution material 202 and the two distribution materials 21 below the distribution material 202. In this manner, wherever force is applied in the area in which the foundation materials 10 are disposed and placed, the force is distributed to the four leg portions 102 of the same foundation material 10 or the plurality of adjacent foundation materials 10, and the expected impact absorption capability can be obtained. Note that the distribution material 204 is arranged to fill the space generated by arranging the distribution material 202 and the distribution material 203 so as to avoid stumbling or the like and improve ease of walking.

The surface layer material 30 has a laminated structure of a vinyl choride resin layer on a walking surface and a form layer below the vinyl chloride resin layer. Since a slight gap is designed among the distribution material 201, the distribution material 202, the distribution material 203, and the distribution material 204 to have movability, the surface layer material 30 has a function of covering the gap and increasing the walkability. In addition, since a slight gap is designed between each of the distribution material 201, the distribution material 202, the distribution material 203, and the distribution material 204, and a case is considerable where a shift occurs corresponding to a space of the gap in use, the distribution material 201, the distribution material 202, the distribution material 203, and the distribution material 204 may be bonded or fixed to the surface layer material 30 and installed on the distribution material 21.

The buffer material 50 is installed in the space inside the foundation material 10. A raw material may be various types of forming agents such as urethane foam, rubber sponge, polyurethane, gel for absorbing impact, and the like, and is not essential to exert of the function of the flooring material system 1.

EXAMPLE

The foundation material 10 was configured in which L1 was 300 mm, t1 was 3 mm, t2 was 3 mm, and h1 was 100 mm, d1 was 100 mm, w1 was 15 mm, x was 5 mm, y was 100 mm, and a raw material was NR rubber, and four units of the foundation material 10 were used. In addition, the distribution material 21 was a wooden board shaped in a square with one side of 300 mm and a thickness of 3 mm, and the lower layer material 40 was a wooden board with one side of 300 mm and a thickness of 3 mm, and four sets each were used. Furthermore, a wooden board was used for the distribution material 201 in which L3 was 149 mm and t3 was 3 mm, a wooden board was used for the distribution material 202 in which L4 was 149 mm and t4 was 3 mm, a wooden board was used for the distribution material 203 in which L5 was 140 mm and t5 was 3 mm, and a wooden board was used for the distribution material 204 in which L6 was 100 mm, L7 was 140 mm, and t6 was 3 mm. Note that for measuring the impact absorption capability, the surface layer material 30 and the buffer material 50 were not used.

Figure 14:
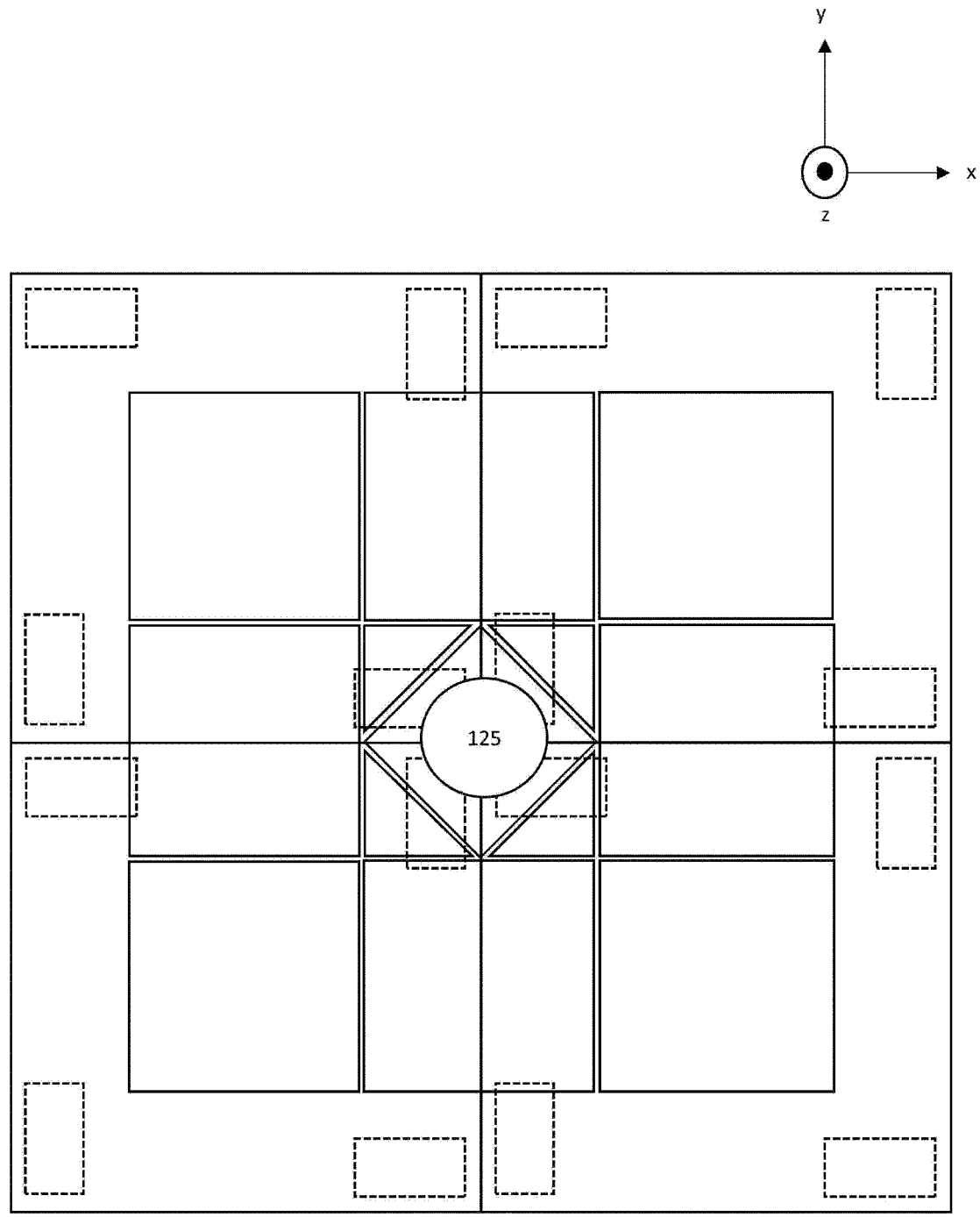
FIG. 14 is another top view of an arrangement of four sets in each of which the foundation material 10 is placed on the lower layer material 40, the distribution material 21 is further placed thereon, and the distribution material 201, the distribution material 202, the distribution material 203, and the distribution material 204 are further placed thereon, and illustrates a position where force is applied.

The lower layer material 40, the foundation material 10, the distribution material 21, the distribution material 201, the distribution material 202, the distribution material 203, and the distribution material 204 which have been described in the previous paragraph were arranged in the stated order and positions illustrated in FIG. 1 and FIG. 14 (hereinafter, referred to as a test flooring material unit 1), and installed on an impact measurement system. An experiment of drop of a jig weighing 7.5 kg onto a center portion of the test flooring material unit 1 (a position 125 in FIG. 14) was conducted which reproduced a state where a person with a body weight 65 kg fell and had a thighbone bruised, and drop impact force (N) was measured. Note that as comparison tests, a commercially available flooring, sponge, and a commercially available impact absorption flooring material disclosed in Patent document 2 were similarly tested on the impact measurement system.

Figure 16:
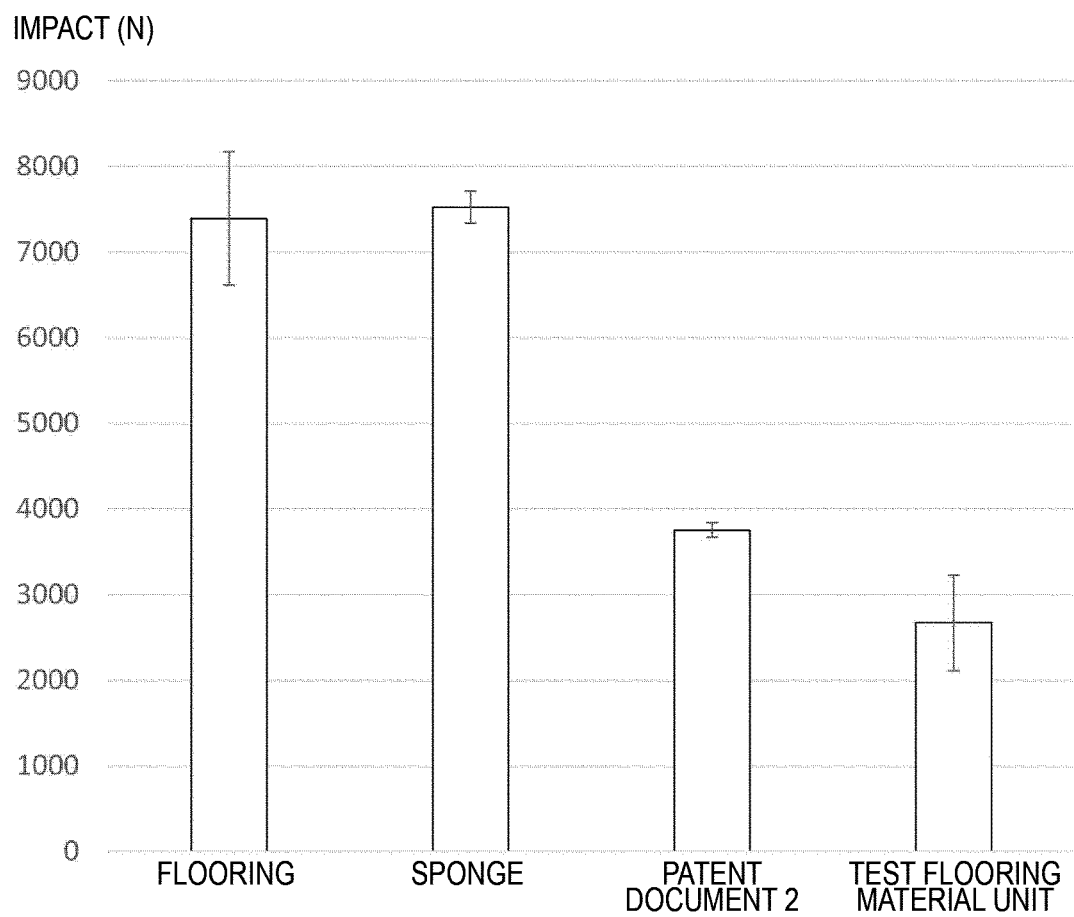
FIG. 16 is another diagram illustrating the result of the review of the impact absorption capability.

FIG. 15 illustrates a test result of the impact absorption capability. For each of the flooring materials, the test was conducted three times, and its mean and standard deviation were described. In addition, FIG. 16 illustrates a graph of the result. The flooring was a wooden material, and it is considered that the impact was not absorbed hard, and the impact was approximately 7500 N. In addition, although the sponge may appear to absorb impact, the sponge was soft and its thickness was not sufficient and hit the bottom, and it is considered where the sponge had almost the same value as the flooring. Note that in the commercially available impact absorption flooring material disclosed in Patent document 2, it was found that impact at approximately 3800 N was measured, and around half of the impact was absorbed. Furthermore, impact at approximately 2700 N was measured in the test flooring material unit 1, which exerted the highest impact absorption capability among the flooring materials tested this time.

Note that there is an account in Non-patent document 1 (PLoS ONE 13(8): e0200952.) that load applied to a thighbone surface is approximately 70% of load applied to a body surface. In addition, there is an account in Non-patent document 2 (The Journal of Bone and Joint Surgery, vol., 77-A. NO. 3. MARCH 1995) that a man aged 73 may break a thighbone at approximately 2000 N. In FIG. 17, when the test result was converted into the impact applied to the thighbone, the impact applied to the thighbone was below 2000 N in only the test flooring material unit 1, and it was proved that the test flooring material unit 1 had the impact absorption capability at which bone fracture at the time of falling by an elderly person is sufficient avoided.

Figure 18:
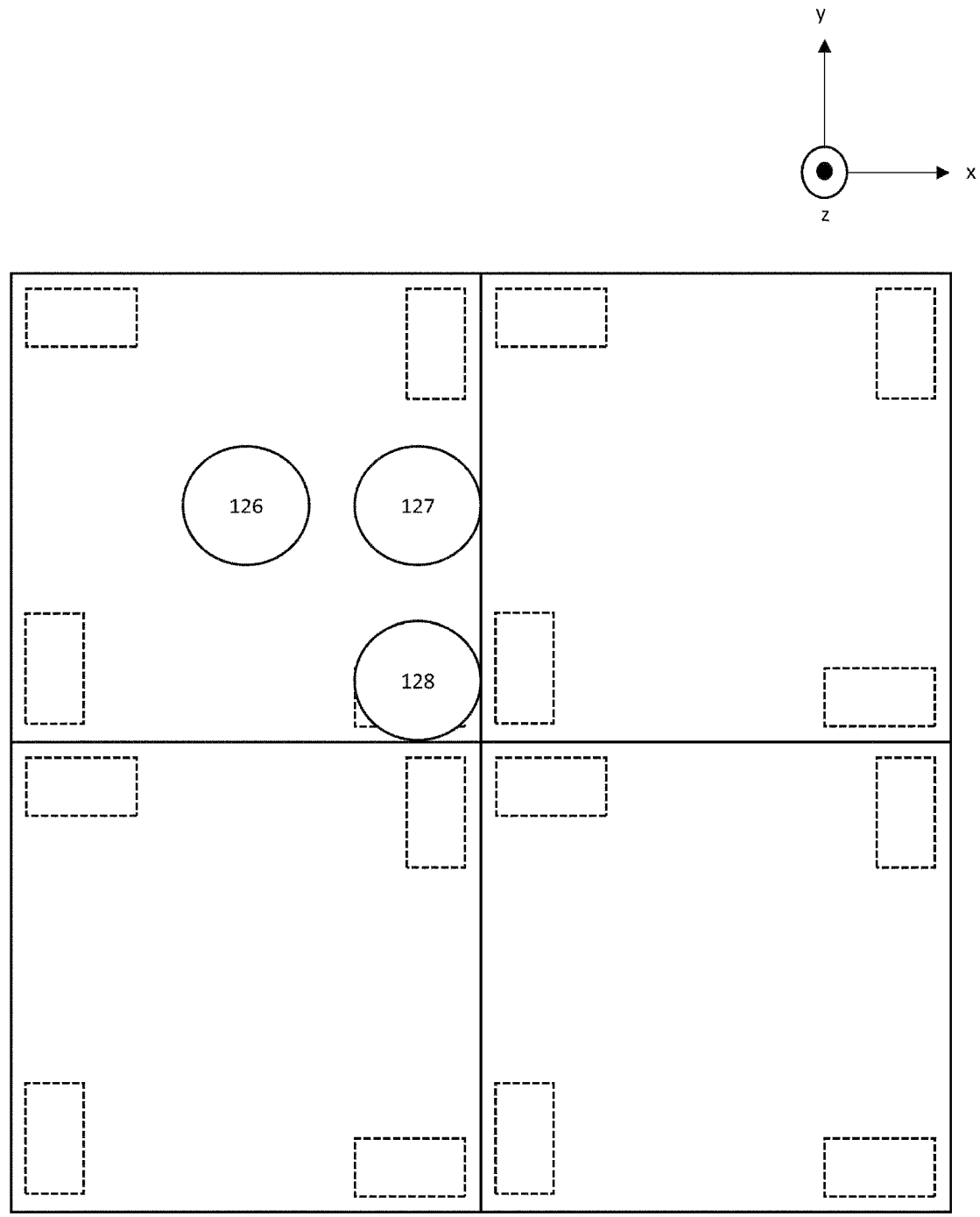
FIG. 18 is still another top view of an arrangement of four sets in each of which the foundation material 10 is placed on the lower layer material 40, and the distribution material 21 is further placed thereon, and illustrates positions where force is applied.
Figure 19:
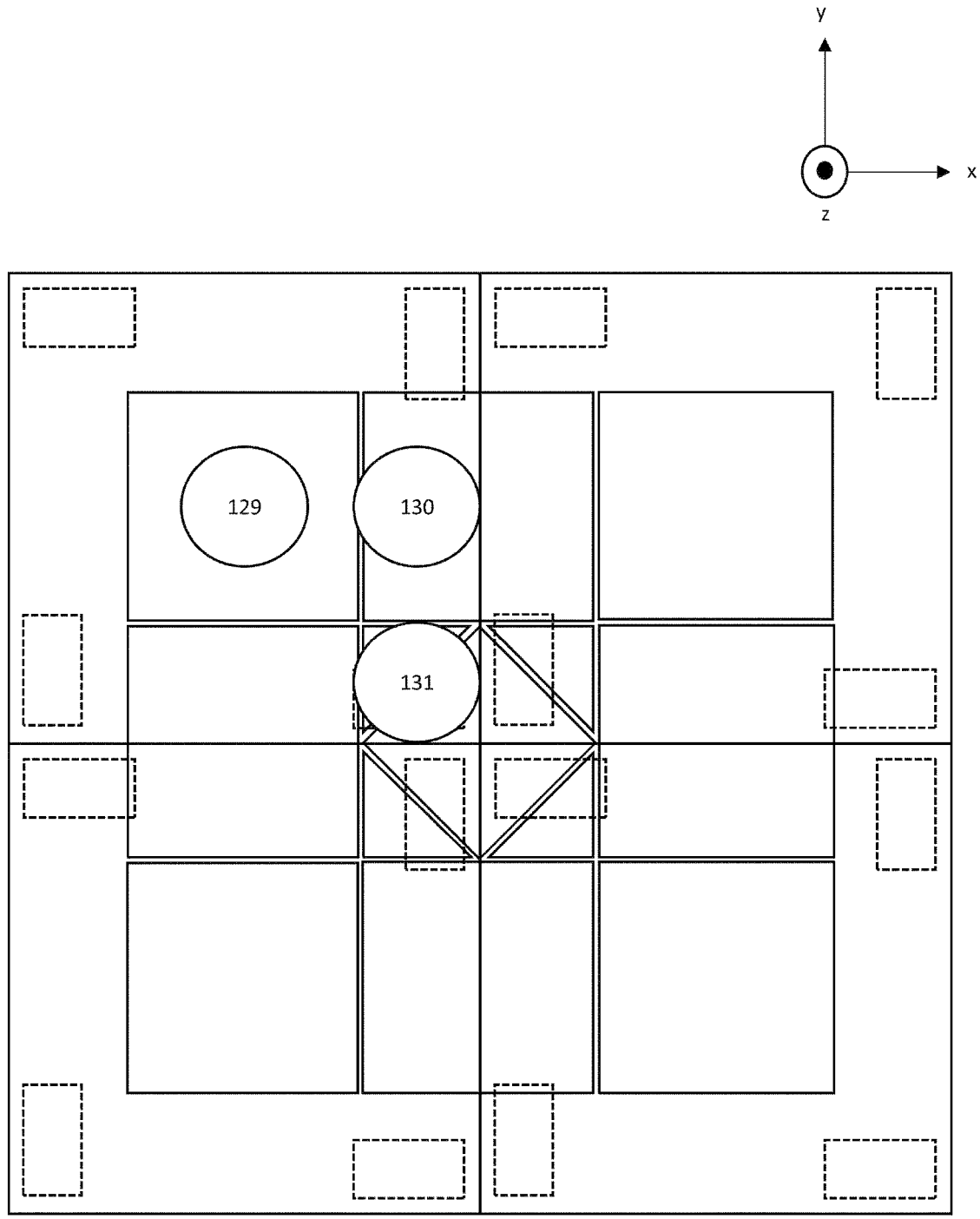
FIG. 19 is still another top view of an arrangement of four sets in each of which the foundation material 10 is placed on the lower layer material 40, the distribution material 21 is further placed thereon, and the distribution material 201, the distribution material 202, the distribution material 203, and the distribution material 204 are further placed thereon, and illustrates positions where force is applied.

In addition, as another test, an effect of the distribution material 201, the distribution material 202, the distribution material 203, and the distribution material 204 was measured. Each of the test flooring material unit (illustrated in FIG. 19) and a test flooring material unit without distribution materials (illustrated in FIG. 18) obtained by removing the distribution material 201, the distribution material 202, the distribution material 203, and the distribution material 204 from the test flooring material unit was installed on the impact measurement system. In the test flooring material unit and the test flooring material unit without distribution materials, an experiment of drop of a jig weighting 7.5 kg onto a position 126 (center), a position 127 (side), and a position 128 (corner) in FIG. 18, and a position 129 (center), a position 130 (side), and a position 131 (corner) in FIG. 19 to measure drop impact force (N) was conducted.

FIG. 20 illustrates a result of the test flooring material unit without distribution materials. For each of the positions, the test was conducted three times, and its mean and standard deviation were described. In addition, FIG. 21 illustrates a graph of the result. When force was applied to the position 126, since it is considered that the force is evenly applied to the leg portions 102 of the foundation material 10, the best balance between the impact absorption capability and the stability at the time of walking is obtained. In addition, when force was applied to the position 127 and the position 128, the impact was weakened by approximately 40% as compared with a case where the force was applied to the position 126. This means that the impact was absorbed by the leg portions 102, and a state is established where buckling occurs at the time of walking although the impact absorption capability was exerted, and furthermore, when high force is applied, there is a possibility that the impact absorption capability of the leg portion 102 tends to hit the bottom.

Figure 23:
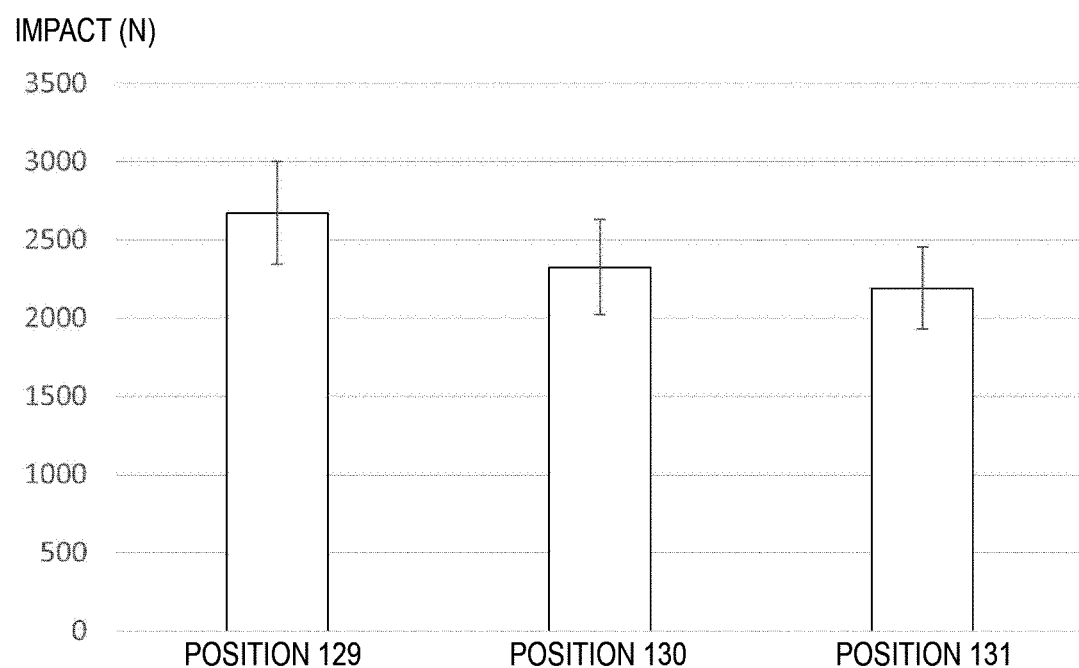
FIG. 23 is another diagram illustrating the result of the review of the effect of the distribution material 201, the distribution material 202, the distribution material 203, and the distribution material 204.

FIG. 22 illustrates a result of the test flooring material unit. For each of the positions, the test was conducted three times, and its mean and standard deviation were described. In addition, FIG. 23 illustrates a graph of the result. When force was applied to the position 129, since it is considered that the force is evenly applied to the leg portions 102 of the foundation material 10, the best balance between the impact absorption capability and the stability at the time of walking is obtained. In addition, when force was applied to the position 130 and the position 131, the impact was weakened by approximately 10% to approximately 20% as compared with a case where the force was applied to the position 129. This indicates that with the presence of the distribution material 201, the distribution material 202, the distribution material 203, and the distribution material 204, wherever the force is applied, the distribution of the force to some extent is carried out, and the stability at the time of walking is also secured.

Furthermore, as another experiment, a test of a depression amount at the time of walking was conducted. While a case was assumed where a flooring material was stomped by a feel of an elderly woman, hemispherical 50-kg load with a diameter of 5 cm was applied to flooring materials illustrated below. The used flooring materials are a joint mat (polyurethane foam), the commercially available impact absorption flooring material disclosed in Patent document 2, and the test flooring material unit. Note that load is applied to the position 129 in FIG. 19 in the test flooring material unit.

Figure 25:
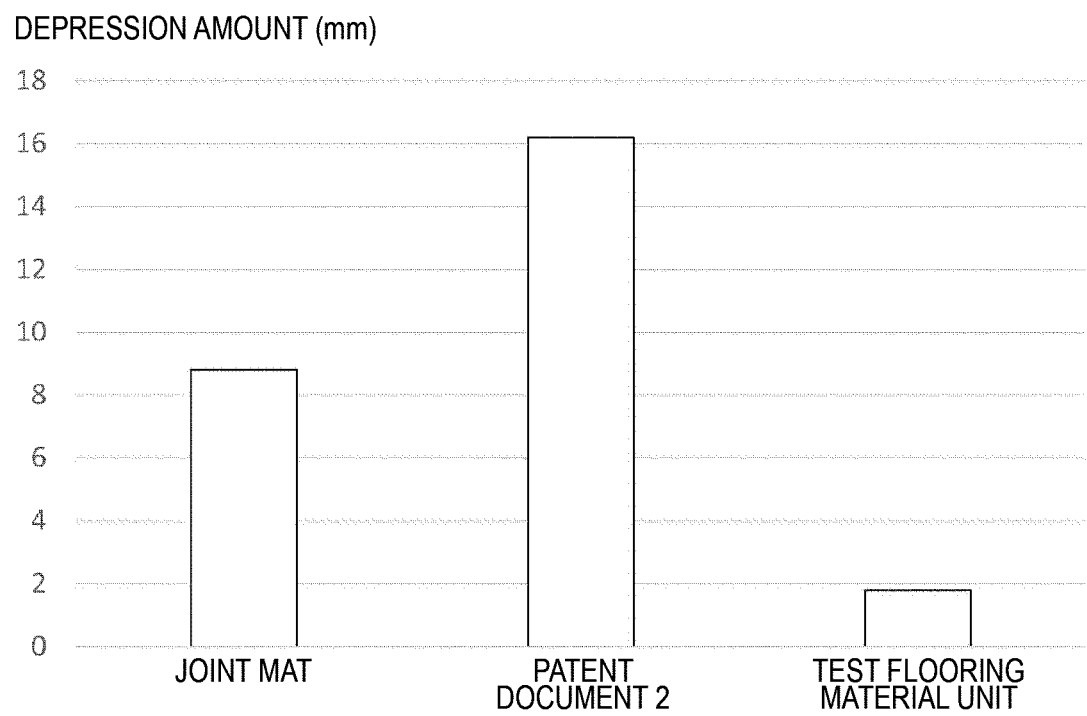
FIG. 25 is another diagram illustrating the result of the review of the depression amount of the flooring material.

FIG. 24 and FIG. 25 illustrate a test result of the depression amount at the time of walking. The joint mat depresses by slightly less than 10 mm. Since the commercially available impact absorption flooring material disclosed in Patent document 2 depresses close to twice as much as the joint mat, the commercially available impact absorption flooring material depresses when the entire body weight is applied onto a heel of one leg even during normal walking. The flooring material unit has the depression amount of slightly less than 2 mm, and is hardly affected during normal walking.

The embodiment described above is merely an exemplification to facilitate the understanding of the present invention, and is not to be construed to restrict the present invention. Alterations and improvements can be made to the present invention without departing from the gist of the invention, and of course the present invention includes equivalents thereof.

EXPLANATION OF REFERENCES 1 flooring material unit (test flooring material unit); 20 distribution material; 21 distribution material; 30 surface material (surface layer material); 40 lower layer material; 101 top portion layer; 102 leg portion; 103 lower portion layer; 1021 surface; 1022 surface; 201 distribution material; 202 distribution material; 203 distribution material; 204 distribution material

What is claimed is:

1. A flooring material system configured to absorb impact, wherein the flooring material system comprising:
    a plurality of foundation materials, wherein each of the plurality of foundation materials comprises a top portion layer and a lower portion layer, wherein a surface of the top portion layer and a surface of the lower portion layer are substantially parallel to a ground;
    a plurality of leg portions with an impact buffer capability, wherein each of the plurality of leg portions buckles when a certain force or greater is applied thereto in a vertical direction; and
    a distribution material configured to distribute force applied to the plurality of foundation materials, wherein the distribution material comprises:
        a first distribution material, wherein the first distribution material is arranged across two adjacent foundation materials of the plurality of foundation materials, and
        a second distribution material, wherein the second distribution material is arranged across four adjacent foundation materials of the plurality of foundation materials, wherein the four adjacent foundation materials are substantially on the same plane and are all in contact at one point, wherein the plurality of leg portions comprises four adjacent leg portions each associated with one of the four adjacent foundation materials, and wherein the second distribution material partially overlaps with each of the four adjacent leg portions.

2. The flooring material system according to claim 1, wherein the plurality of leg portions are arranged at four corners of each of the plurality of foundation materials.

3. The flooring material system according to claim 1, wherein each of the plurality of leg portions includes a groove on one side.

4. The flooring material system according to claim 2, wherein each of the plurality of leg portions includes a groove on one side.

* * * * *